United States Patent [19]

Ono et al.

[11] Patent Number: 4,940,889
[45] Date of Patent: Jul. 10, 1990

[54] METHOD AND APPARATUS FOR VISUAL INDICATION OF OPTICAL ALIGNMENT OF PHOTOELECTRIC SWITCH

[76] Inventors: Shoichi Ono, 12-8, Takashima 1-chome, Suwa-shi, Nagano-ken; Atsuhito Kobayashi, 6-2, Honmachi 1-chome, Okaya-shi, Nagano-ken, both of Japan

[21] Appl. No.: 394,130

[22] Filed: Aug. 15, 1989

[51] Int. Cl.⁵ .............................................. H01J 40/14
[52] U.S. Cl. ................................ 250/214 R; 250/221; 356/152
[58] Field of Search ............ 250/201, 221, 561, 203 R, 250/214 R; 356/141, 152

[56] References Cited

U.S. PATENT DOCUMENTS 3,532,892 10/1970 Murphy ................................ 356/152
4,310,756 1/1982 Sick et al. ............................ 250/221

FOREIGN PATENT DOCUMENTS 23243 7/1973 Japan .
25185 6/1978 Japan .

Primary Examiner—David C. Nelms
Attorney, Agent, or Firm—Morrison Law Firm

[57] ABSTRACT

An alignment system for photoelectric switch includes a variable frequency oscillator producing a frequency which varies according to a light reception signal from a light receiving element in the photoelectric switch. A light emitting device is energized by the output of the variable frequency oscillator to give a visual indication of alignment. A threshold compares the amplitude of the light reception signal with a preset voltage. When the light reception signal exceeds the preset voltage, a logic element provide steady illumination of the light emitting device as an indication that alignment is completed. A lower threshold is then applied to the threshold to keep the light emitting device steadily illuminated until misalignment or propagation conditions reduce the amount of light received.

8 Claims, 3 Drawing Sheets

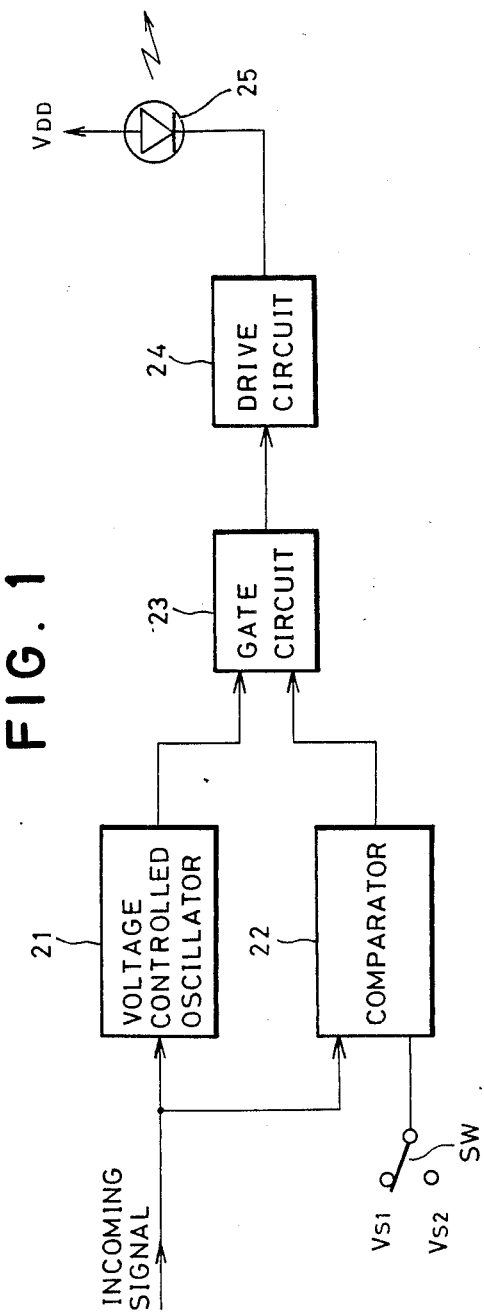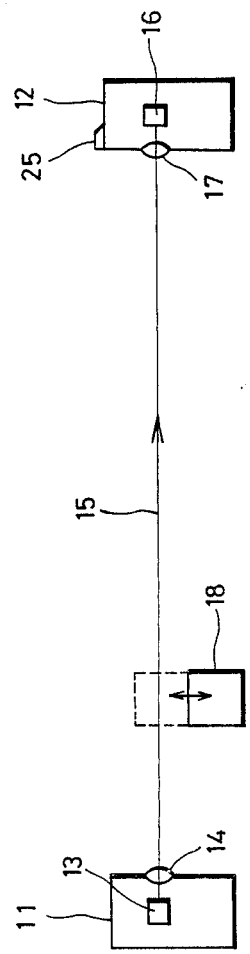

4,940,889

METHOD AND APPARATUS FOR VISUAL INDICATION OF OPTICAL ALIGNMENT OF PHOTOELECTRIC SWITCH

BACKGROUND OF THE INVENTION

1. Field of the Invention

This invention relates to a photoelectric switch having a light projecting part and a light receiving part and more particularly to a method and apparatus for aligning a light beam from the light projecting part with an optical axis of the light receiving part.

2. Description of the Prior Art

A photoelectric switch detects whether or not an object is presentat a position intercepting a beam of projected light according to whether or not the beam of projected light from a light projecting part is received by a light receiving part. It is necessary to adjust an optical axis so that the beam of projected light from the light projecting part is centered on the light receiving part. Adjustment of the optical axis aided by apparatus for deciding whether or not a beam of projected light is incident correctly on the light receiving part.

A prior art apparatus of this kind is disclosed in Japanese Utility Model Publication No. 25185/1978. The apparatus amplifies an electrical signal generated by a light receiving part as a result of receiving a beam of projected light from a light projecting part. A light emission indicator on the light projecting part and light receiving part is energized by the amplified electrical signal.

The aforementioned apparatus operates the light emission indicator as an indication of the beam of projected light being incident on the lihgt receiving part. However, the light receiving part detects the light beam and generates an electrical signal even when the optical axis of the light beam is somewhat displaced from the axis of the light receiving part. Therefore operation of the light emission indicator, by itself, is not sufficient to discriminate whether the optical axis is disposed in the optimum position or is somewhat displaced.

Another prior art apparatus, disclosed in Japanese Utility Model Publication No. 23243/1973, uses a tuning indicator tube receiving an amplified light reception signal generated by the light receiving prt on reception of a beam of projected light. When the light beam is received on an optical axis at the center of light receiving part, a maximum light reception signal is recognizeable by a minimization of a sector projected on an indicating part of the tuning indicator tube.

However, it is difficult to discriminate an indication on the tuning indicator tube from a distance. This is particularly true when a long distance separates the light emitting part and light receiving part. Thus an indication on the tuning indicator tube at the light receiving part cannot be discriminated from the light emitting part while the optical axis is adjusted. Thus it is difficult to carry out the adjustment.

It is a problem inherent in both prior art techniques that neither can discriminate whether a light beam is incident directly on an optical axis or is displaced therefrom. Also, it is difficult to discern the incident state of the optical axis from the light projecting part side where such adjustment usually is made.

SUMMARY OF THE INVENTION

An object of the invention is therefore to provide a photoelectric switch wherein including an indicator for optical alignment that provides an indication from which it is possible to know whether the optical axis is in optimum incident or is somewhat displaced from a light receiving element. This can be determined visually over a relatively long distance, thus facilitating alignment of the optical axis.

An optical alignment system according to the invention includes a voltage controlled oscillator for generating a square wave of a frequency proportional to a light reception signal level from a light receiving part. A comparator decides whether or not the light reception signal level is above an alignment voltage set at the time of adjustment. The alignment voltage threshold is higher than an operating voltage threshold set for normal operation. It further comprises a gate circuit for applying a continuous signal generated by the comparator when the light reception signal exceeds the voltage threshold and a square wave signal from the voltage controlled oscillator when the light reception signal is below the voltage threshold. The output of the gate circuit drives an indicating light emitting element.

According to the invention, when the light reception signal level is higher than the adjustment voltage threshold, the indicating light emitting element is lighted statically by thecontinuous signal generated by the comparator, indicating optimum alignment of the optical axis. If the light reception signal level is lower than the voltage set at the time of adjustment, the indicating light emitting element is driven by the square wave signal at a frequency proportional to the light reception signal level. The resultant flickering of the light emitting element indicates that the optical axis is displaced. The amount of displacement is seen in the lengthening of the flicker period. That is, the larger the displacement the longer the flicker period. The flicker period becomes shorter as the displacement is reduced. Accordingly, working personnel can adjust the optical axis in the direction which reduces the flicker period of the indicating light emitting element.

Briefly stated, the present invention provides an alignment system for a photoelectric switch which includes a variable frequency oscillator producing a frequency which varies according to a light reception signal from a light receiving element in the photoelectric switch. A light emitting device is energized by the output of the variable frequency oscillator to give a visual indication of alignment. A threshold compares the amplitude of the light reception signal with a preset voltage. When the light reception signal exceeds the preset voltage, a logic element provide steady illumination of the light emitting device as an indication that alignment is completed. A lower threshold is then applied to the threshold to keep the light eimtting device steadily illuminated until misalignment or propagation conditions reduce the amount of light received.

According to an embodiment of the invention there is provided an alignment system for aligning an optical axis of a light beam with a light receiving element, comprising: means for producing a light reception signal having an amplitude related to an amount of light received by the light receiving element, a light, means for flashing the light at a frequency related to the amplitude exceeds a reference voltage, and the reference voltage being a value that is exceeds by the amplitude when alignment of the optical axis with the light receiving element is substantially optimum.

According to a feature of the invention, there is provided a method for aligning an optical axis of a light beam with a light receiving element, comprising: producing a light reception signal having an amplitude related to an amount of light received by the light receiving element, flashing a light at a frequency related to the amplitude, halting the flashing when the amplitude exceeds a reference voltage, and the referece voltage being a value that is exceeded by the amplitude when alignment of the optical axis with the light receiving element is substantially optimum.

According to a further feature of the invention, there is provided an alignment system for aligning an optical axis of a light beam with a light receiving element, comprising: means for producing a light reception signal having an amplitude related to an amount of light received by the light receiving element, a light, means for flashing the light at a frequency related to the amplitude, means for halting the flashing when the amplitude exceeds a reference voltage, the reference voltage being a value that is exceeded by the amplitude when alignment of the optical axis with the light receiving element is substantially optimum, and automatic means for replacing the reference voltage with a second reference voltage having a smaller valu when the means for halting halts the flashing.

According to a still further feature of the invention, there is provided an alignment system for aligning an optical axis of a light beam with a light receiving element, comprising: means for producing a light reception signal having an amplitude related to an amount of light received on the light receiving element, a variable frequency oscillator responsive to the light reception signal for producing a frequency that is variable with the amplitude, means for omparing the amplitude with a threshold, a logic device responsive to the frequency and the means for comparing for producing a variable frequency output when the light reception signal is less than the amplitude, and for producing a steady signal when the light reception signal exceeds the threshold, and an indicating device energized by an output of the logic device.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a simplified block diagram of an optical alignment indicator for a photoelectric switch according to an embodiment of the invention;

FIG. 2 is a conceptual drawing illustrating a basic construction of a transmission type of photoelectric switch;

DETAILED DESCRIPTION OF THE PREFERRED EMBODIMENT

Figure 3:
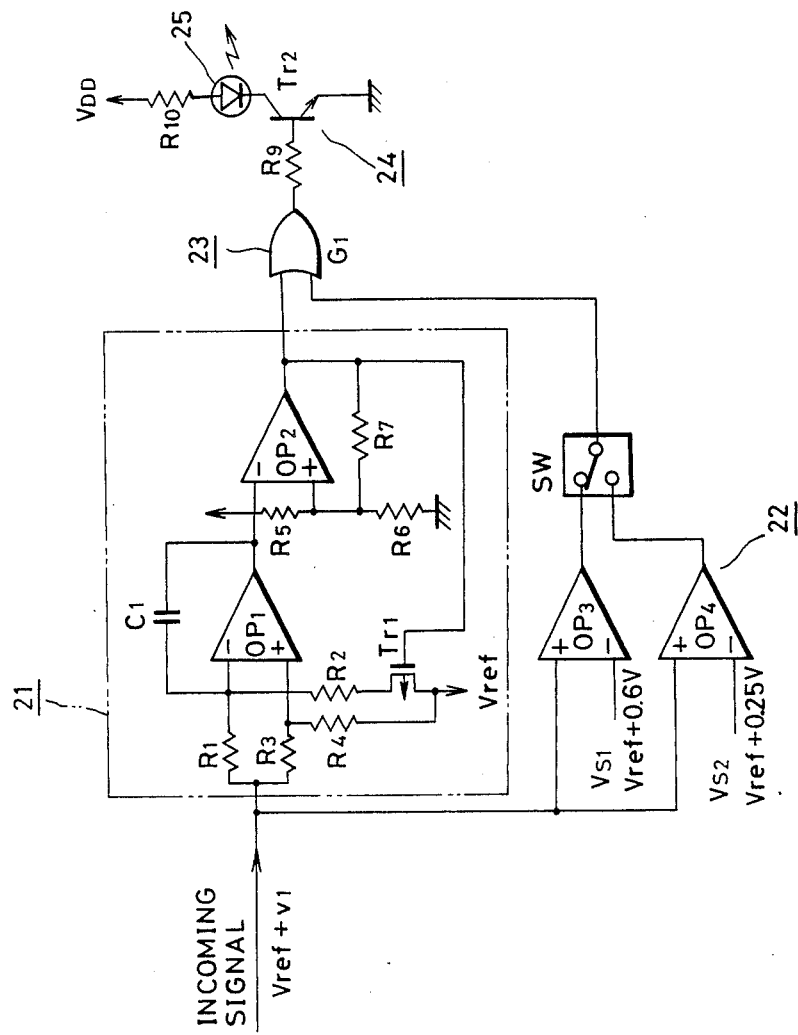
FIG. 3 is a schematic diagram showing each part in FIG. 1.

The invention will now be described with reference to the accompanying drawings representing one embodiment thereof.

A simplified representation of a transmissive photoelectric switch is shown in FIG. 2. A reference numeral 11 denotes a light projecting part facing a light receiving part 12. The light projecting part 11 has a light emitting element 13 projecting a light beam 15 such as infrared ray or the like toward the light receiving part 12 through an emitting lens 14. the light receiving part 12 has a light receiving element 16, receives the light beam 15 coming from the light projecting part 11 through a receiving lens 17, and generates an electrical signal having an amplitude according to the quantity of received light, namely 18 denotes an object whose presence or absence is to be detected. The presence of the object 18 at a predetermined position is detected by interruption of the light beam 15 reaching the light receiving element 16.

Referring now to FIG. 1, a voltage controlled oscillator 21 receives the light reception signal and generates a square wave signal at a low frequency (0 Hz to 15 Hz, for example) proportional to amplitude of the light reception signal.

A comparator 22 compares the light reception signal with a selected one of two set voltages $V_{s1}$ or $V_{s2}$, and generates a continuous signal of "H" level whenever the light reception signal is higher than the set voltage $V_{s1}$ or $V_{s2}$. Here, $V_{s1}$ indicates a voltage set at the time of adjustment, and $V_{s2}$ indicates a voltage set for normal operation when the object is detected. These voltages are related as $V_{s1} > V_{s2}$. The set voltages $V_{s1}$, $V_{s2}$ are selected by a switch SW.

A gate circuit 23, receives the square wave signal from the voltage controlled oscillator 21 and the continuous signal from the comparator 22. The output of the gate circuit 23 is connected to a drive circuit 24 each. The output of the drive circuit illuminates an indicating light emitting element (LED for example) 25 either constantly or flickering at the frequency of voltage controlled oscillator 25.

A concrete configuration of each circuit described in FIG. 1 is described with reference to FIG. 3.

Two operational amplifiers OP$_1$, OP$_2$ and a field effect transistor (hereinafter called FET) Tr$_1$ are the main constituents of the voltage controlled oscillator 21. A light reception signal $V_{ref} + V_1$ ($V_{ref}$ being a reference voltage with $V_1$ as a variation) from the light receiving part 12 is applied to the minus (−) and the plus (+) inputs of the operational amplifier OP$_1$ through a resistance $R_1$ or $R_3$, respectively. The minus (−) input of the operwational amplifier OP$_1$ is connected to the output of same operational amplifier OP$_1$ through a capacitor $C_1$. The minus (−) input of the operational amplifier OP$_1$ is also connected to a reference voltage $V_{ref}$ through a resistance $R_2$ and the source/drain path of FET Tr$_1$. Further, the plus (+) input of same operational amplifier OP$_1$ is connected to the reference voltage $V_{ref}$ supply through a resistance $R_4$.

The operational amplifier OP$_2$ functions as a comparator. Its minus (−) input is connected to the output of the operational amplifier OP$_1$. The plus (+) input of the operational amplifier OP$_2$ is connected to a junction of resistances $R_5$, $R_6$ and also connected to its own output through a resistance $R_7$. The output of the operational amplifier OP$_2$ is connected to a base of FET Tr$_1$.

The output signal of the voltage controlled oscillator 21 is the output of the operational amplifier 3P$_2$. This output signal is a square wave signal having a frequency in the range of, for example, 0 to 15 Hz, proportional to the level of the light reception signal $V_1$. The level of the light reception signal, or the incoming signal $V_1$, is maximized when an optical axis of the light beam 15 from the light projecting part 11 is incident on the center of the light receiving element 16 of the light receiving part 12. Therefore the frequency of the square wave signal is maximized in this condition. The level $V_1$ of the light reception signal drops as the optical axis of the light beam 15 is displaced from the center of the light receiving element 16. The frequency of the square wave signal also decreases as this occurs.

The comparator 22 comprises two comparators $OP_3$, $OP_4$ and a changeover switch SW. The light reception signal $V_{ref}+V_1$ is impressed on the plus (+) input of each of the comparators $OP_3$, $OP_4$. The voltage $V_{s1}$ is set at the time of adjustment to $V_{ref}+6$ V, for example. The light reception signal is applied to the minus (+) input of the comparator $OP_3$. The voltage $V_{s2}$ is set for operation to $V_{ref}30$ 0.25 V, for example. The voltage $V_{s2}$ is applied to the minus (−) input the comparator $OP_4$. Thus the comparator $OP_3$ compares $V_1$ with 0.6 V, while the comparator $OP_4$ compares $V_1$ with 0.25 V. When the voltage $V_1$ exceeds the selected one of 0.6 V or 0.25 V, the output of its respective operational amplifier is inverted, thereby generating a continuous signal of "H" level. The output of one of the comparators $OP_3$, $OP_4$ is selected by the changeover switch SW. The changeover switch SW in FIG. 1 is shown connected for changing the set voltages $V_{s1}$, $V_{s2}$, at the input of the comparator 22. This is different from the connections in FIG. 3 where one of the outputs of the comparators $OP_3$, $OP_4$ is selected. However, the same result is achieved.

The gate circuit 23 uses an OR gate $G_1$ receiving the square wave signal from the voltage controlled oscillator 21 and the continuous signal from the comparator $OP_2$ or $OP_4$ selected by the switch SW. The output of the OR gate $G_1$ is fed through a resistance $R_9$ to a base of transistor $Tr_2$ constituting the drive circuit 24. The indicating light emitting element (LED for example) 25 and a resistance $R_{10}$ are connected in series with the collector of the transistor $Tr_2$ and a power source $V_{DD}$. The emitter of the transistor $T_{r2}$ is connected to ground.

During adjustment of the optical axis, the higher voltage $V_{s1}$, set at the time of adjustment, is first selected for use by the comparator 22. That is, $V_{s1}$ is selected by the switch SW in FIG. 1, and the comparator $OP_3$ is selected by the switch SW in FIG. 3.

The light beam 15 is projected toward the light receiving part 12 from the light projecting part 11. If the optical axis of the light beam 15 is displaced from the center of the light receiving element 16, the light reception signal $V_{ref}+V_1$ is less than its maximum value. The larger the displacement the lower the level of light reception signal $V_{ref}+V_1$. The light reception signal $V_{ref}+V_1$ is applied to the voltage controlled oscillator 21 and the comparator 22. A square wave signal of a frequency proportional to the level (level of $V_1$) of an incoming signal is generated by the voltage controlled oscillator 21. Accordingly, if the optical axis is displaced for off the center of the light receiving element 16, the square wave signal has a low frequency. The closer the axis of the light beam 15, comes to the center of the light receiving element 16, the higher the frequency of the square wave signal.

When the switch SW selects the ouput of comparator $OP_3$, the incoming signal level $V_1$ is compared with the set voltage $V_{s1}$ of 0.6 V. The set voltage $V_{s1}$ is higher than the voltage set for normal operation during object detection. If the optical axis is displaced, the incoming signal level $V_1$ is not capable of exceeding the set voltage $V_{s1}$. Accordingly, the output of the comparator $OP_3$ remains at the "L" level.

Consequently, the OR gate $G_1$, of the gate circuit 23 feeds only the square wave signal from the voltage controlled oscillator 21 to the base of the transistor $Tr_2$ of the drive circuit 24. The transistor $Tr_2$ is turned on every time the square wave signal is received at its base, thus energizing the indicating light emitting element 25. The indicating light emitting element 25 thus flickers at the frequency of the square wave signal produced by the voltage controlled oscillator 21.

The set voltage $V_{s1}$ ($V_{ref}+0.6$ V) of the comparator $OP_3$ is selected such that the light reception signal is just able to exceed it when the optical axis coincides exactly with the center of the light receiving element 16. In other words, the "L" level remains until the optimum alignment is secured. When optimum alignment is found, the output of the comparator $OP_3$ changes to the "H" level. Consequently, the indicating light emitting element 25 flickers with increasing frequency until the best condition is obtained. During this adjustment, the light reception signal level also rises as the optical axis approches the best condition. When optimum alignment is reached, the flickering stops and the indicating light emitting element is constantly illuminated.

In use, working personnel adjust the optical axis of the light beam 15 in the direction that tends to shorten the flickering period of the indicating light emitting element 25. When the optical axis reaches the optimum condition, the output of the comparator $OP_3$ is inverted to the "H" level. This forces the output of the OR gate $G_1$ to remain at a steady "H" level. The indicating light emitting element 25 is lighted constantly. Accordingly, the optical axis is fixed finally in the state where the indicating light emitting element 25 is lighted constantly statically, thus ending the adjusting work.

After the above adjustment is completed, the switch SW is changed to reduce the set voltage used by the comparator 22 to $V_{s1}$ ($V_{ref}+0.25$ V). As a result the indicating light emitting element 25 reminas illuminated constantly as long as the incoming signal $V_1$ remains greater than 0.25 V. That is, a tolerance of 0.35 V (0.6 V−0.25 V=0.35 V) is left after adjustment. Consequently, even if the optical axis is displaced a small amount after adjustment, or if light propagation degrades, normal operation for detecting object can be maintained. If the misalignment is great enough to reduce the incoming signal $V_1$ below 0.2k V then the indicating light emitting element 25 begins to flicker.

Figure 5:
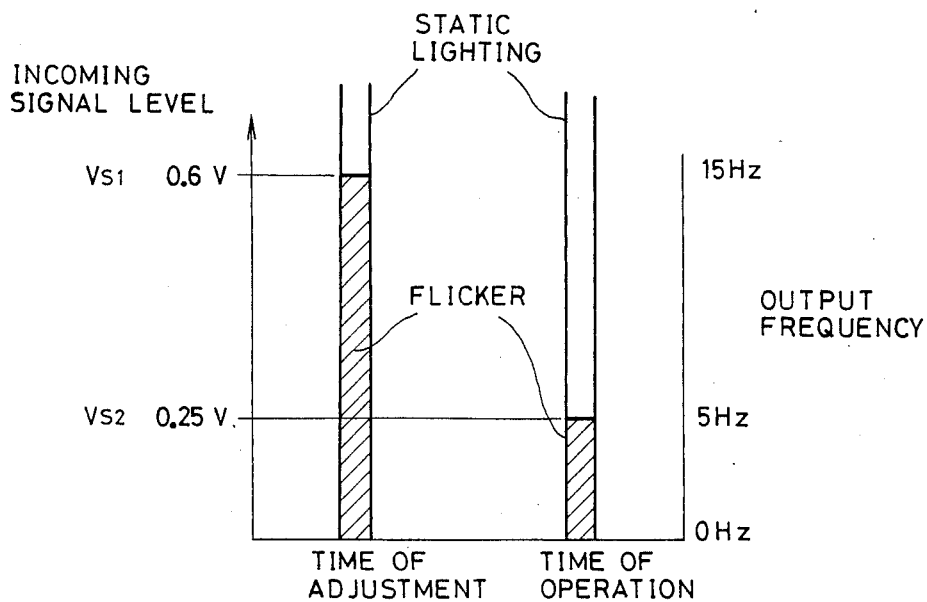
FIG. 5 is a graph illustrating an operation of the invention.

FIG. 5 illustrates a relation between the aforementioned incoming signal $V_1$ (light reception signal) and the set voltages $V_{s1}$, $V_{s2}$ of the comparator 22, a relation between a static lighting and flickering of the indicating light emitting element 25, and a flicker frequency.

As described, during adjustment, the reference voltage desired value for optimum alignment, wherein the indicating light emitting element 25 is constantly lighted, is set to a high value. During normal operation, the reference voltage is reduced. Thus accurate adjustment of the optical axis is ensured, and the system is capable of tolerating changes in the environment such as oil on the optics, mist in the path of the light beam 25, and the like, in addition to a minor displacement of the optical axis.

The technique of the present invention using variable frequency flickering to indicate displacement of the optical axis is effective in stimulating the human eyesight over a relatively long distance. Therefore the effect of adjustments can be discriminated more easily from a distance as compared to the prior art tuning indicator tube or the changing color of the light emitting element changing in a sequency red→yellow→green. Thus the optical axis can easily be adjusted by a worker located at the light projecting part 11.

Further, the signal to noise ratio (S/N ratio) may be enhanced by applying hysteresis to the comparators $OP_3$, $OP_4$. Techniques for applying hyteresis are so well known that they do not require description.

In the above-described embodiment, the set voltages $V_{s1}$, $V_{s2}$ in the comparator 22 are changed by manual operation of the switch SW. However, the system may automatically select $V_{S1}$ when the power is turned on so that alignment may be performed. Then it may select the voltage $V_{s2}$ for normal operation autiomtically after adjustment. Such an embodiment will be described hereunder with reference to FIG. 4. Like reference characters represent like parts in FIG. 3, and hence a further description is omitted thereof.

Figure 4:
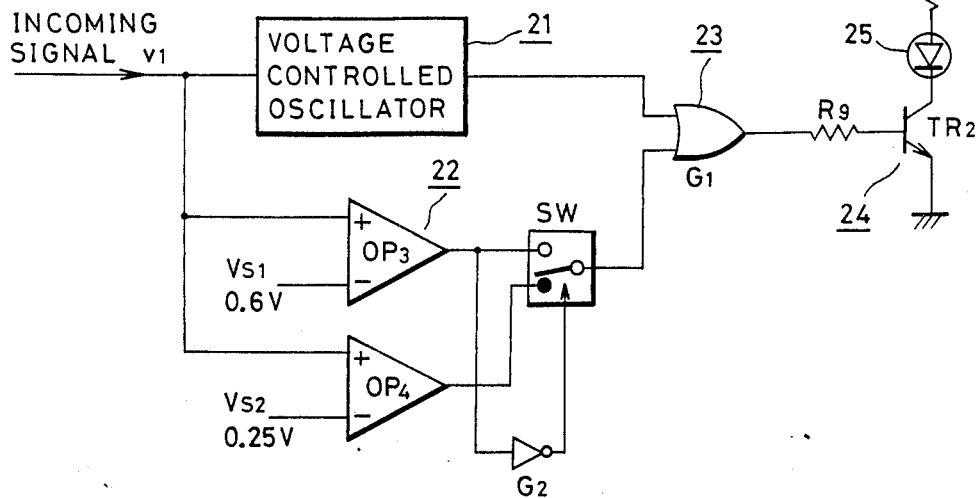
FIG. 4 is a schematic diagram of an optical alignment indicator according to another embodiment of the invention.

In the embodiment of FIG. 4, an invertor $G_2$ receives the output of the comparator $OP_3$. Inverter $G_2$ controls the changeover switch SW. The output of the comparator $OP_3$ is at the "L" level at the time of adjustment until the optical axis is optimized. The "L" level output is inverted to the "H" level by the invertor $G_2$. This drives the switch SW to the position connecting the output of the comparator $OP_3$ to the input of the OR gate $G_1$. When the optical axis is aligned, the output of the comparator $OP_3$ is changed to the "H" level. The "H" level output is inverted to the "L" level by the invertor $G_2$, and the switch SW is reset to the position connecting the output of the comparator $OP_4$ to the input of the OR gate $G_1$.

Accordingly, the set voltage of the comparator 22 during normal object detection is $V_{s2}$, and normal operation can cotinue until the incoming signal level $V_1$ falls below 0.25 V. When $V_{11}$ falls below 0.25 V for any reason, the indicating light emitting element 25 recommences flickering, the switch SW is changed over automatically to the comparator $OP_3$, and the flickering continues until alignment raise $V_1$ to a value greater than 0.6 V.

As described above, according to the invention, correct alignment of a beam of light on the light receiving part 12 can definitely be discriminated by constant lighting and variable frequency flickering of the indicating light emitting element 25. A displacement of the optical axis can be discriminated by changes of the flickering period. Therefore adjustment of the optical ais is facilitated as compared with a prior art, and alignment of the optical axis can be optimized with high precision.

Having described preferred embodiments of the invention with reference to the accompanying drawings, it is to be understood that the invention is not limited to those pecise embodiments, and that various changes and modifications may be effected therein by one skilled in the art without departing from the scope or spirit of the invention as defined in the appended claims.

What is claimed is:

1. An alignment system for aligning an optical axis of a light beam with a light receiving element, comprising:
    means for producing a light reception signal having an amplitude related to an amount of light received by said light receiving element;
    a light;
    means for flashing said light at a frequency related to said amplitude;
    means for halting said flashing when said amplitude exceeds a reference voltage; and
    said reference voltage being a value that is exceeded by said amplitude when alignment of said optical axis with said light receiving element is substantially optimum.

2. An alignment system according to claim 2, further comprising means for changing said reference voltage to a lower value, whereby flashing of said light is prevented until said amplitude is reduced below said lower value.

3. A method for aligning an optical axis of a light beam with a light receiving element, comprising:
    producing a light reception signal having an amplitude related to an amount of light received by said light receiving element;
    flashing a light at a frequency related to said amplituede;
    halting said flashing when said amplitude exceeds a reference voltage; and said reference voltage being a value that is exceeded by said amplitude when alignment of said optical axis with said light receiving element is substantially optimum.

4. A method according to claim 3, further comprising changing said reference voltage to a lower value, whereby flashing of said light is prevented until said amplitude is reduced below said lower value.

5. An alignment system for aligning an optical axis of a light beam with a light receiving element, comprising;
    means for producing a light reception signal having an amplitude related to an amount of light recieved by said light receiving element;
    a light;
    means for flashing said light at a frequency related to said amplitude;
    means for halting said flashing when said amplitude exceeds a reference voltage;
    said reference voltage being a value that is exceeded by said amplitude when alignment of said optical axis with said light receiving element is substantially optimum; and
    automatic means for replacing said reference voltage with a second reference voltage having a smaller value when said means for halting halts said flashing.

6. An alignment system for aligning an optical axis of a light beam with a light receiving element, comprising:
    means for producing a light reception signal having an amplitude related to an amount of light received on said light receiving element;
    a variable frequency oscillator responsive to said light reception signal for producing a frequency that is variable with said amplitude;
    means for comparing said amplitude with a threshold;
    a logic device responsive to said frequency and said means for comparing for producing a variable frequency output when said light reception signal is less than said amplitude, and for producing steady signal when said light reception signal exceeds said threshold; and
    an indicating device energized by an output of said logic device.

7. An alignment system according to claim 6, werein said indicating device is a light emitting device.

8. An alignment system according to claim 6, further comprising means for replacing said threshold with a lower threshold.

* * * * *

UNITED STATES PATENT AND TRADEMARK OFFICE
CERTIFICATE OF CORRECTION

PATENT NO. : 4,940,889
DATED      : July 10, 1990
INVENTOR(S) : Shoichi Ono, et al It is certified that error appears in the above-identified patent and that said Letters Patent is hereby corrected as shown below:

ON TITLE PAGE:   Item   [73]        should read;

Chinon Kabushiki Kaisha,
      Nagano-ken, Japan

Signed and Sealed this

Thirty-first Day of March, 1992

Attest:

HARRY F. MANBECK, JR.

*Attesting Officer*      *Commissioner of Patents and Trademarks*